Sept. 28, 1971  P. H. KNOTT  3,608,206
EXHIBITOR ASSEMBLY FOR IMPRINTING OBSERVABLE MARKINGS
ON DISPLAY PLANAR MEANS BY LOCALIZED PRESSURE
Filed May 21, 1970  7 Sheets-Sheet 1

Sept. 28, 1971 P. H. KNOTT 3,608,206
EXHIBITOR ASSEMBLY FOR IMPRINTING OBSERVABLE MARKINGS
ON DISPLAY PLANAR MEANS BY LOCALIZED PRESSURE
Filed May 21, 1970 7 Sheets-Sheet 3

Sept. 28, 1971     P. H. KNOTT     3,608,206
EXHIBITOR ASSEMBLY FOR IMPRINTING OBSERVABLE MARKINGS
ON DISPLAY PLANAR MEANS BY LOCALIZED PRESSURE
Filed May 21, 1970     7 Sheets-Sheet 6

Sept. 28, 1971             P. H. KNOTT             3,608,206
EXHIBITOR ASSEMBLY FOR IMPRINTING OBSERVABLE MARKINGS
ON DISPLAY PLANAR MEANS BY LOCALIZED PRESSURE

United States Patent Office 3,608,206
Patented Sept. 28, 1971

3,608,206
EXHIBITOR ASSEMBLY FOR IMPRINTING OBSERVABLE MARKINGS ON DISPLAY PLANAR MEANS BY LOCALIZED PRESSURE
Philip H. Knott, 315 E. 86th St., Apt. 2N E., New York, N.Y. 10028
Filed May 21, 1970, Ser. No. 39,236
Int. Cl. B43l *1/12*
U.S. Cl. 35—26                                    12 Claims

ABSTRACT OF THE DISCLOSURE

Exhibitor assemblies for imprinting observable markings of a decorative, informative or amusing nature. Rigid carrier structure supports all of the elements of each assembly, which may be portable. In each a depressible, flexible, planar display means, either in the form of a sheet or a flat envelope loaded with a layer of viscous liquid or paste, is supported laterally in a temporarily guided position for observation of its outer face. This planar display structure is of a distinctive coloration and removable from its lateral guided position to effect removal from the assembly of observable markings that are developed on its outer face by operation of the assembly. The planar display structure has either a temporary or permanent opacity which will hide to an effective degree at a reasonable distance of observation any underlying surface or element. Planar backing means has a surface of contrastingly different coloration underlying and substantially hidden by the planar display structure with a minute space normally intervening them. For example, the planar display structure is of a seeming white hue and the underlying backing surface is black. The carrier structure movably supports a pressure-localizing member, which may be located below the backing means or outward of the planar display structure, but in both cases a lands-bearing face thereof faces toward the planar display structure, and when this member is outward of the latter it is of see through character so that the outer display face may be observed therethrough. A plurality of pressure-localizing, raised lands are carried in relatively spaced relation on this member surface with their faces directed toward the planar display structure. These lands faces differ in design and some or all of them are complementary to each other so that composite images developed from the use of a chosen number of them will include individual images thereof that supplement each other in a desired arrangement. When the pressure-localizing member is located below the backing surface it underlies the backing means and the latter is a flexible web so that pressure applied by any suitable means, such as a rubbing instrument or ram, to a localized portion of the outer face of the planar display structure will flex the latter and the web together over the face of any one of the pressure-localizing lands that underlies the web in alignment with the locality of the applied pressure. When the pressure-localizing land is located outward of the planar display structure any land thereof is used as the means of applying the pressure to the outer face of the former, to flex the planar display structure locally against the backing surface that is held firmly. In either case the planar display structure may become windowed in the shape of the face of each such employed land to develop on the former an image of the latter in a color matching the coloration of the backing surface. Successive operations with different lands of the pressure-localizing member develop an observable composite image of a plurality of such markings on the outer face of the planar display structure that are desirably associated with each other, and this may be eliminated from the assembly for reuse of the latter by removing the planar display structure and, in the case of the fluid-contained envelope smoothing out the contained windowed viscous fluid.

The pressure-localizing member may be a lands-bearing rotary disk, or one or more slides with each of the latter slidably mounted in an individual elongated channel.

The planar display structure and contrasting backing surface may be a Magic Slate sub-assembly of either the temporary adhering sheet form or the mobile paste envelope form that are both described in line 19 of column 1 to line 34 of column 2 of the Knott U.S. Pat. No. 3,279,- 100 of Oct. 18, 1966.

BACKGROUND OF THE INVENTION

The present invention relates to exhibitor assemblies which are operated to develop on display faces thereof observable markings that are removable. It is of a type to permit reuse of the assembly.

I have previously proposed in my prior U.S. Pat. No. 3,279,100 of Oct. 18, 1966 exhibitors of this same general type. However, the subject matter thereof is concerned solely with the development of a single image by progressive imprinting of outlines of parts thereof in broken or dotted lines with some thereof being provided with appearances of distinctively different colors by shift of a see through pressure-localizing plate carrying a uniform pattern of raised lands in the form of tiny buttons or parallel ribs. The device thereof is equipped with a color contributing panel which bears on its surface that is opposed to the observable display face a plurality of groups of like uniform patterns of like small areas, with one group being of one color and another group being of another color, and with these areas of one color staggered with respect to those of the other color. With the pressure-localizing plate in one position its like lands or buttons are located over the areas of one group which have the same color to guide production of windowing in dots along a broken line scribed on the display face and with these dot windows aligned with the same color areas to appear to be of this color. When the pressure-localizing plate is shifted laterally to another position its like lands or buttons are located over the areas of another group which also have the same color with respect to each other, but with this second color being different from the first color. Windows are then produced in dots along a second broken line that is now scribed on the display face with these dot windows aligned with the second color areas so as to appear to be of this different second color. The artistic character of images developed in this device is wholly dependent upon the skill of the operator.

SUMMARY

Embodiments of the present invention differ from the device of the identified Pat. No. 3,279,100 as to combinations of elements so that they will produce an entirely different result. As distinguished therefrom it is an object of the invention to combine some of those prior art elements with new elements to form a new exhibitor assembly combination which when operated by repetition of an action and intervening guided adjustment of parts that require no skill there will be assembled step-by-step in a finally produced composite image complementary parts that include considerable desired internal detail all in full line delineation. Each such developed composite image will be removable from the assembly for reuse of the latter and, if desired, a permanent record may be made thereof which need not be displayed to observation in the assembly. Each embodiment of the assembly, some of which may be of the readily portable type and easily hand operable, will imprint progressively observable complementary parts of the final composite image that is of a decorative, informative or amusing nature. The artistic character of the images developed is predetermined by the skill of the designer of the imprinting parts that are embodied in the assembly.

For this purpose rigid carrier structure supports all of the combined elements of the assembly during operational use. It includes a relatively fixed planar backing means which provides an upper backing surface. The carrier structure movably supports outward of the backing surface a depressible, flexible, display planar means which effectively hides with appreciable efficacy at least a portion of the backing surface and provides an outer face on which complemental parts of an ultimate composite image are progressively, step-by-step, developed, the image parts and the composite image having considerable internal detail with all parts thereof delineated in full line form. The support of the planar display means is such that it allows the latter to be moved out away from the backing surface for removal from the assembly of observable markings which make up the composite image, and it guides temporary placement and holding of the planar display means in a relative operable position of covering with close spacing at least a portion of the backing surface. The carrier structure also movably supports for lateral motion a pressure-localizing member having a planar surface bearing a plurality of spaced raised lands that have faces which differ in design, i.e., in outline and internal detail, that are complemental to each other. These faces are predesigned by one of considerable skill so as to eliminate the need for exercise of skill by the operator. These land faces are arranged in opposed relation to the planar display means and each is to be moved to a position of alignment with a particular portion of the display face area with the exclusion of the others as to the locality of this particular alignment. Thus, step-by-step, such an alignment is effected between a certain display face portion and a chosen one of the land faces and pressure is then applied to this display face portion in an manner requiring no skill, so as to imprint therein a full image of this underlying land, and then this action is repeated with respect to another display face portion and another differing land face, with further repetition thereof if required, progressively to add to the previously imprinted image or images and laterally thereof an additional image of such other land face so that they complement each other.

The association of the backing surface and the planar display means may be similar to the combination of such elements in Magic Slates either of the temporary adhering sheet form or of the mobile paste envelope form, as fully described in line 19 of column 1 to line 34 of column 2 of the U.S. Pat. No. 3,279,100 of Oct. 18, 1966, or the planar display means may be a flexible sheet of opaque paper. The pressure-localizing member and its mounting for lateral motion of its lands-bearing surface relative to the support of the planar display means, as well as the particular association thereof with respect to the backing surface and the planar display means, are unique. This pressure-localizing member may be movably mounted beneath the backing surface with the faces of its lands facing outwardly in a direction toward the planar display means, in which case the backing structure that carries this backing surface is a flexible web that is closely spaced from both the overlying flexible, planar display means and the faces of pressure-localizing lands in an intervening position. Alternatively, the pressure-localizing member may be movably mounted outward of the observable face of the planar display means in which case it is reversed so that the faces of its lands are directly opposed to this display face, and it is of see through character and/or movable away from the overlying position for ready observation of the display face after the images have been developed on the latter. This pressure-localizing structure may be a rotary disk, or one or more of a plurality of straight slides. As a rotary disk its lands-bearing surface may be subdivided into a plurality of concentric zones each bearing a series of spaced lands with the faces of these lands in each zone being uncomplementary with respect to each other, but complementary to those in the zone or zones adjacent thereto. In the latter case each zone is translated across a separate area of the planar display means in the selective rotation of the disk.

THE DRAWINGS

Other objects of the invention will in part be obvious and will in part appear from reference to the following detailed description taken in connection with the accompanying drawings, wherein like numerals identify similar parts throughout, and in which.

In the embodiment of the invention illustrated in FIGS. 1 to 9 incl. the assembly or device includes a relatively rigid carrier structure 1 which supports the other elements of the assembly, and it has a base that may be a relatively stiff, flat plate 2 of cardboard, fiberboard, and the like, preferably but not necessarily rectangular in shape. A relatively rigid, pressure-localizing planar member is movably supported in the carrier structure, such as a relatively stiff, flat disk 3 rotatably mounted on the base plate in substantial parallel relation thereto. The top surface 4 of this rotary disk constitutes at least one elongated, circular zone concentric with its axis of rotation, and preferably it is subdivided into a plurality of concentrically arranged, elongated circular zones 5, 6, 7, 8 and 9. Each such zone bears a series of spaced pressure-localizing, raised lands or cameo areas 10 which are arranged successively therein in spaced apart relation with the faces of such lands in any particular one of the zones differing from each other in design while being uncomplemental to each other. By contrast the designs of the lands faces in one zone are complemental to those in any zones that are adjacent thereto. For example each of such plurality of circular zones 5, 6, 7, 8 and 9 may carry lands faces which are shaped as parts of composite pictorial representations, grotesque images, artistic design units, etc. The rotary disk 4 preferably is covered by a relatively stiff, flat cover plate 11, or the like, which may be similar to the base plate 2 in general construction and shape, and this cover plate is supported by and suitably spaced upward away from the base plate by suitable intervening shimming means 12, which together define a substantially cylindrical chamber 13 or equivalent guidance recess in which the disk is rotatably confined. Marginal portions of the base plate 2, the shimming plates 12 and the cover plate 12 may be suitably secured together, such as by adhesive. This cover plate 12 is of a character to prevent observation therethrough of structure located therebeneath, e.g., opaque, and has a window 14 defined therein (FIGS. 1, 2 and 3) which preferably extends from the vicinity of the center of rotation of the rotatable disk radially outward to the vicinity of the peripheral edge of of the disk 3, and this window may be generally rectangular in shape. The base plate 2 of this carrier structure 1 movably supports, preferably by means of the cover plate 11 mounted thereon, a closure 15 for this window, which includes a depressible, flexible, display planar means 16. While the lands-bearing, relatively stiff, rotatable disk 3 may be made of see-through, or transparent, material, preferably it is opaque. In any event, the flexible display planar means 16 that covers the window 14 normally is of sufficient opacity or non-see-through character to block from view with appreciable efficacy at a point of observation outward thereof any otherwise observable surface or other elements lying therebelow. Thus this flexible display planar means 16 effectively blocks off from clear view or substantially hides a rectangular area of the lands-bearing face of the rotary disk 3 which is equal in dimension and aligned with the window area, and a like area of an outwardly facing backing surface which is provided by an intervening planar backing means, which may be in the form of a flexible web 17 that is more fully described hereinafter.

In this FIGS. 1 to 4 incl. embodiment the carrier structure 1 is provided with means 18 to support the flexible display planar means 16 in a manner permitting movement thereof out away from the opposed, window-delineated area of the backing means 17 for removal from the assembly of display markings that are to be developed on this display planar means in the operation of this assembly. This support means may be in the form of a window frame 18 which supports and guides placement of this display planar means 16 over the chosen area of the backing surface that is provided by the backing web 17 and temporarily holds it in such relative position during the development of the display markings thereon. For this purpose this embodiment includes a Magic Slate sub-assembly.

This Magic Slate sub-assembly preferably is of the temporary adhering sheet from thereof that is described in line 19 of column 1 to line 7 of column 2 of my prior U.S. Pat. No. 3,279,100 of Oct. 18, 1966, wherein is embodied a depressible, flexible, translucent display sheet 16, which preferably is of light or whitish hue, having a degree of white opacity and a releasing adhering surface of distinctively different color, or colors in different sections thereof, opposed in face-to-face juxtaposition to but normally slightly spaced outward from the display sheet. When the releasing adhering surface is made up of a plurality of sections of different colors the resulting coloration thereof is contrastingly different in all such sections from the color of the display sheet. This releasing adhering surface is, by way of example, the outer face of a flexible opaque web 17, which may be a woven fabric sheet, with this outer face underlying and opposed to the flexible display sheet and preferably bearing a tacky layer or film of wax or other similar material of any desired color, e.g., black, to which the display sheet will adhere in areas pressed thereagainst. This distinctively different color, which preferably is of dark hue, of the adhering surface may be imparted thereto by being embodied in the underlying web with the tacky layer being substantially transparent or translucent, or such color may be embodied in the tacky layer itself. Also, if desired, the tacky layer or film may be intervened between the underlying web and the display sheet by being applied to the back surface of the latter, or an intervening transparent sheet surfaced on both sides by such tacky films may be employed to cause mutual adherence to the display sheet and underlying web in areas pressed together. However, for simplicity it is preferred that the outer face of the web 17 be provided with one such tacky film for adherence directly thereto of the back surface of the display sheet. In any event the colorations of the display sheet and the backing surface are contrastingly different in a highly distinctive manner.

The flexible, wax-bearing, opaque web 17 preferably is supported by the cover plate margins of the window 14 in the cover plate 11 to lay over the lands-bearing circular zones of the rotatable disk 3 that is located behind the window. For this purpose the edge zones of the web 17 may overlap and be cemented to the marginal zones of the cover plate window 14. The outer face of the cover plate 11 movably supports the window frame 18 which margins this window and although this frame may be supported in guide means from which it may be completely lifted out of the assembly it preferably has one side that is hingedly connected, such as by a flexible strip 19, to the cover plate along one window margin with one margin of this strip adhesively secured to the cover plate and another margin of this strip adhesively secured to the window frame 18. This hinge strip 19 permits swing of this window frame 18 between an inward position adjacent or abutting the cover plate 11, with the sides of the frame margining the sides of the window 14, and an outer swung-away position which uncovers the window margins and separates widely from the window opening any elements carried by the frame. This frame 18 carries or supports the depressible flexible display sheet 16 to cover or overlay the window opening 14 when the sides of the frame abut the cover plate 11 in the frame inward position to oppose this sheet relatively closely to the outer faces of the lands 10 borne by the rotatable disk 3 in the area of the window opening and to widely separate this sheet from these lands faces when the frame is swung out to its outer swung-away position.

The flexible, wax-bearing, opaque web 17 may be marginally secured to the swingable frame 18 beneath or inward of the depressible flexible display sheet 16 with a relatively narrow or minute space intervening the display sheet and wax-bearing web, so that when they are stacked above the faces of the lands 10 exposed in the window opening 14 by swing inward of frame to abutment of the cover plate pressure that is applied to the outer face of the display sheet in areas aligned with the outer faces of these lands will cause such areas to be flexed down to contact with and adherence to the areas of the wax-bearing web intervening such display sheet areas and the faces of these lands. Thus these areas of the otherwise seemingly opaque display sheet 16 will expose to view at a point of observation outward of the display sheet the distinctively different coloration of the underlying wax-bearing web 17 in designs imaging the shapes of the faces of the lands 10 that back this web. However, when the swinging frame 18 carries both the wax-bearing web and the display sheet it should be equipped with suitable stripping means to separate the mutually adhering display sheet 16 and wax-bearing web 17 so as to erase these observable images of the lands 10 after such pressing action for reuse of the device. It is thus simpler and preferred to support the margins of the wax-bearing web on the inner face of the cover plate 11 at the margins of the window opening 14 in the latter and to support the display sheet 16 on the back of the frame by a thin shimming strip 20 that seats down into the window opening 14, with the relative thicknesses of this shimming strip and of this cover plate dictating the spacing between the web and the display sheet. In the latter case, after the back of the display sheet 16 has been locally adhered to the outer face of the wax-bearing web by pressure applied to the display sheet over the faces of the lands 10 successively exposed in the window opening such separation may be readily effected by swinging the frame outward to swing therewith the display sheet out away from the wax-bearing web.

It has been previously indicated that it is preferred that the outer face of the rotatable disk of this FIGS. 1 to 4 incl. embodiment be provided with a plurality of concentrically arranged, elongated circular zones 5, 6, 7, 8 and 9 each bearing along its extent a series of the pressure-localizing lands 10 that are spaced apart with respect to each other. These lands 10 in any particular one of these zones are thus successively arranged therein and an appreciable quantity of the faces of each such series of lands differ from each other in contour or design with the faces of the lands in the respective zones also differing, in order to allow supplementary assembly of images thereof which complement each other in a produced desirable composite image. For this purpose, the faces of the lands in each zone differ in design from all of those in any of the other of these zones with such differing face designs in each zone being complementary to those in the zone or zones adjacent thereto.

Since the image-developing pressure is to be applied to the flexible display sheet 16 it may be desired to overlay or cover it with a protective flexible sheet or film 21 (FIGS. 2 and 3) of slick-surfaced, transparent plastic to protect the display sheet from physical damage. If the pressure is to be applied by a manually manipulated rubbing block or blunt-ended, non-marking stylus 22 its movement over the display sheet will be facilitated by such slick surface of the transparent protective sheet.

Figure 1:
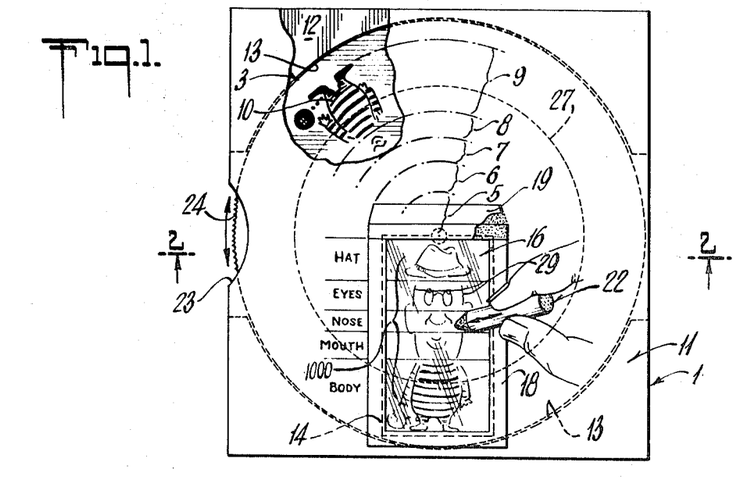
FIG. 1 is a top plan view, with parts broken away, of an embodiment of the exhibitor assembly of the present invention, and illustrating the development of a composite image on display equipment thereof.

For the purpose of facilitating manual translation of the rotary lands-bearing disk 3 circularly, i.e., in the direction in which the circular lands-bearing zones thereof extend, relatively wide, aligned notches 23 may be formed in the base and cover plates 2 and 11 to expose therein for ready access to a person's fingers a section 24 of the peripheral zone of the disk (FIG. 1). The disk 3 thus may be rotated either forward or backward by there grasping it, or engaging a finger against its peripheral edge, and urging it rotatably thereby.

Figures 2, 3, 4, 5, 6:
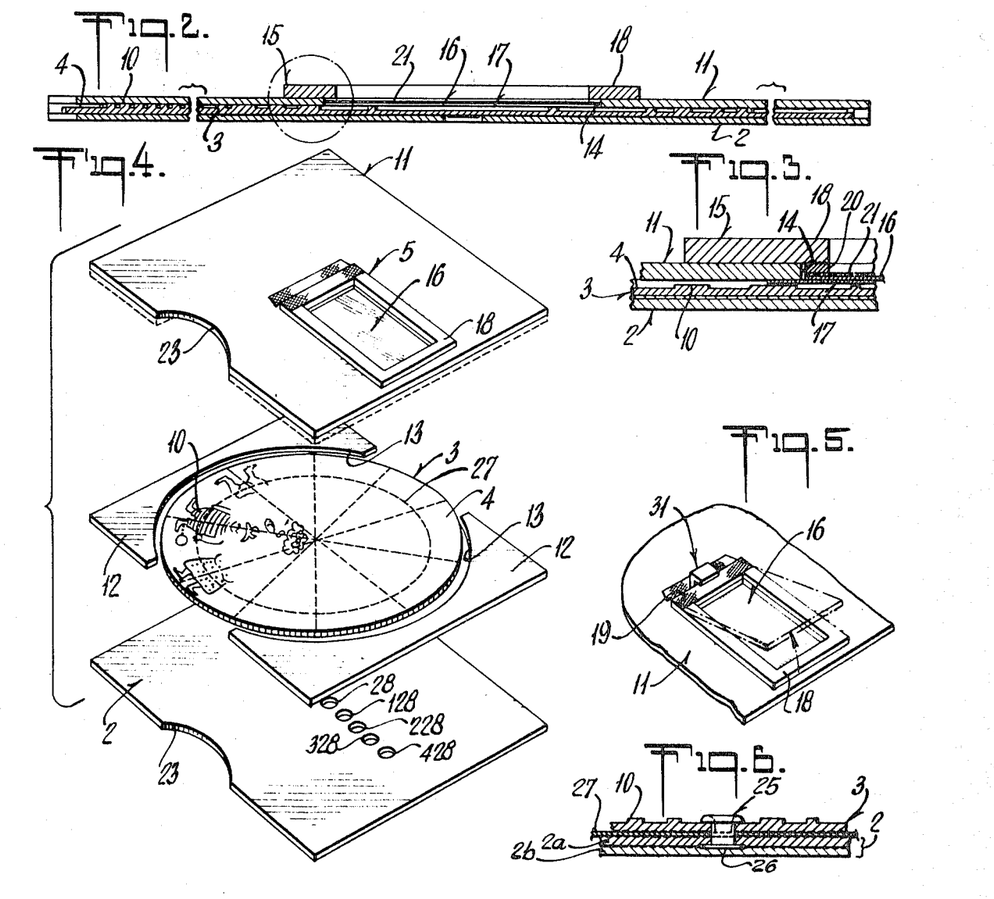
FIG. 2 is an enlarged sectional view taken on line 2—2 of FIG. 1.
FIG. 3 is an enlarged sectional detail of FIG. 2.
FIG. 4 is an exploded perspective view of the structure shown in FIGS. 1 and 2.
FIG. 5 is a perspective view, with parts broken away and in section, of that portion of the top plate of the carrier structure shown in FIGS. 1 to 4 incl. which immediately surrounds the window therein and the hinged cover for this window, illustrating uncovering swing of this cover and a swing limiting stop which desirably may be employed.
FIG. 6 is an enlarged cross-sectional detail of the central portion of the lands-bearing rotary disk embodied in the FIGS. 1 to 4 incl. structure, illustrating a pivotal mount of this disk to the carrier structure back plate.

If desired, the rotary guidance of the disk 3 by the curved chamber walls 13 that are provided by the shimming plates 12 may be supplemented by a central pivot pin 25, as is proposed in FIG. 6. For this purpose the base plate structure 2 may consist of a pair of plies 2a and 2b cemented together with pin head 26 located therebetween. Also, the bottom face of the rotary disk 3 may have cemented thereto an indicator disk 27 (FIG. 8) that will carry guidance indicia or numbers to be viewed through sight ports 28, 128, 228, 328 and 428 (see FIGS. 4 and 7), as is explained hereinafter.

Let it be assumed that a version of this FIGS. 1 to 9 incl. embodiment is intended to serve as an amusement device. For example, it may be intended by the operation thereof there is to be assembled on the display sheet any one of a vast number of different grotesque caricatures of people. The inner or first circular zone 5 of the lands-bearing disk 3, circumscribing the axis of rotation thereof, may bear a plurality of lands 10 with their faces differing in design to produce different images of the tops of people's heads, with differing hair styles or hats, such as that indicated at 500 in FIG. 9. The next or second radially outward zone 6 of the disk 3 may bear a plurality of lands productive of differing images of sets of eyes with or without differing depictions of eyebrows and spectacles, such as that indicated at 600 in FIG. 9. The third zone 7 may bear a plurality of lands productive of differing images of noses, such as that indicated at 700, and the fourth zone 8 may bear a plurality of lands which will produce a plurality of differing images of mouths, such as that indicated at 800. The fifth, outermost zone 9 may bear a plurality of lands which will dictate production of differing images of body trunks, with arms and feet (or only such portions thereof that may normally be seen with major portions naturally hidden due to the depicted attitudes or environments) and variously adorned with clothing which may include different styles of shoes, such as that indicated at 900. The display sheet 16 or its protective cover sheet 21 may be and preferably is marked off or subdivided into transverse or horizontal zones or areas, such as by horizontal straight lines, with each such horizontal area to be traversed by one of the circular zones 5, 6, 7, 8 and 9 of the rotary lands-bearing disk 3 during rotation of the latter, and these areas may be suitably labeled on the top plate 11 along one side margin of the hinged frame or on the latter, as are indicated in FIG. 1. The display sheet 16 or the bottom face of its protective cover sheet 21 may also carry permanent markings depicting the side margins of a head from the hair line portion to the chin portion with the outlines of the ears indicated, as is shown at 29 in FIG. 1.

Figure 7:
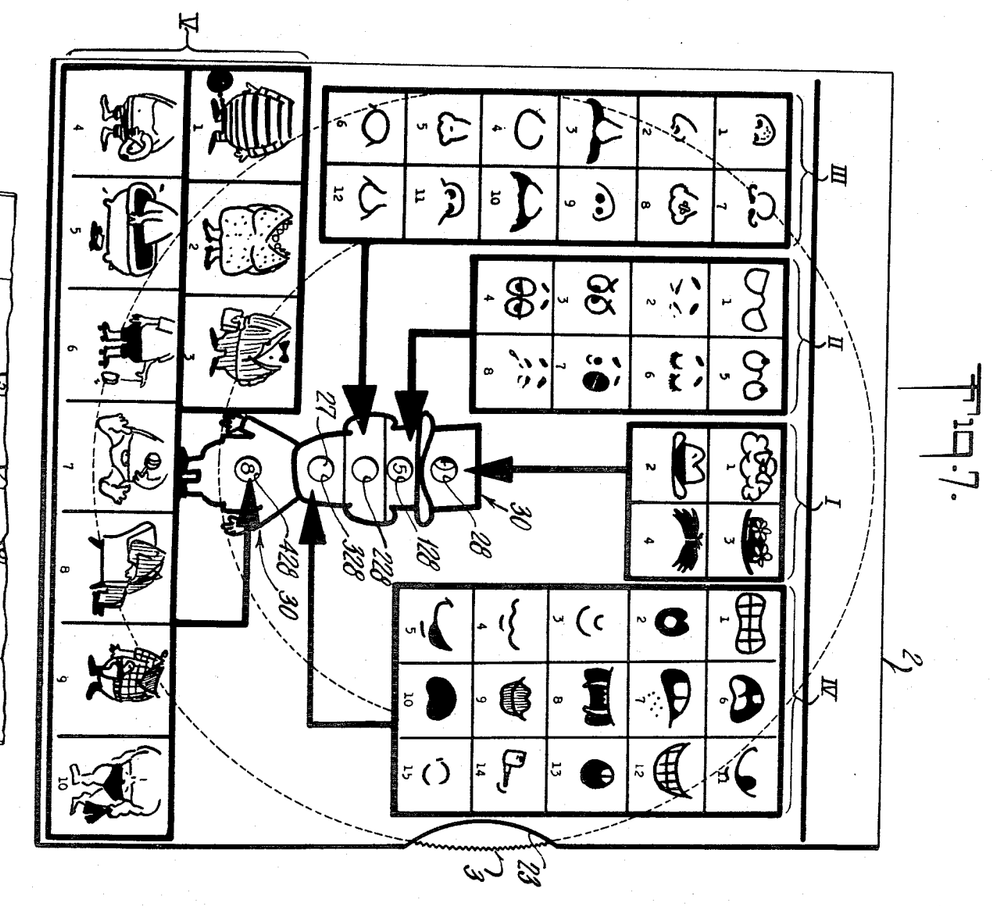
FIG. 7 is an enlarged plan view of the rear face of the back plate of the FIGS. 2 to 4 incl. structure, showing the indicator means provided thereon, including charts and sight ports, for guiding mechanical manipulation that selectively will permit an operator to develop a desired composite image on the window cover.
Figure 8:
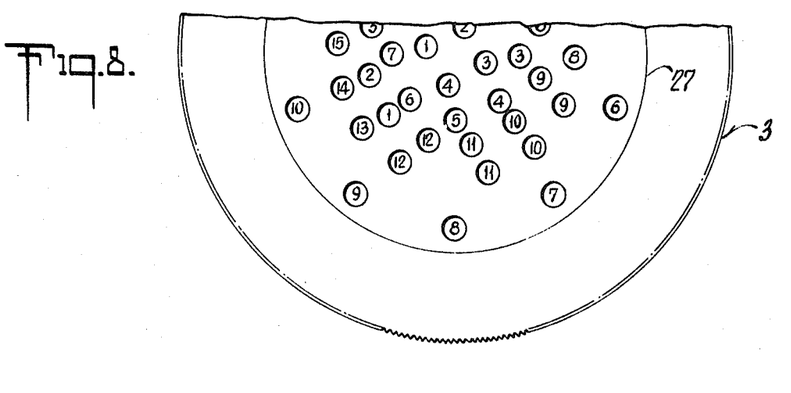
FIG. 8 is a back view, with parts broken away, of the rotary lands-bearing disk of FIGS. 1, 2 and 4, to about one-half scale of an actual working embodiment of the present invention, showing guidance members arranged in circular zones thereof to guide by being viewed selectively in indicator sight ports of FIG. 7 successive disk positions which will locate successively beneath the image display window cover selected lands of such circular zones for progressive assembly of images of the faces of these lands.
Figures 9, 10, 11, 12:
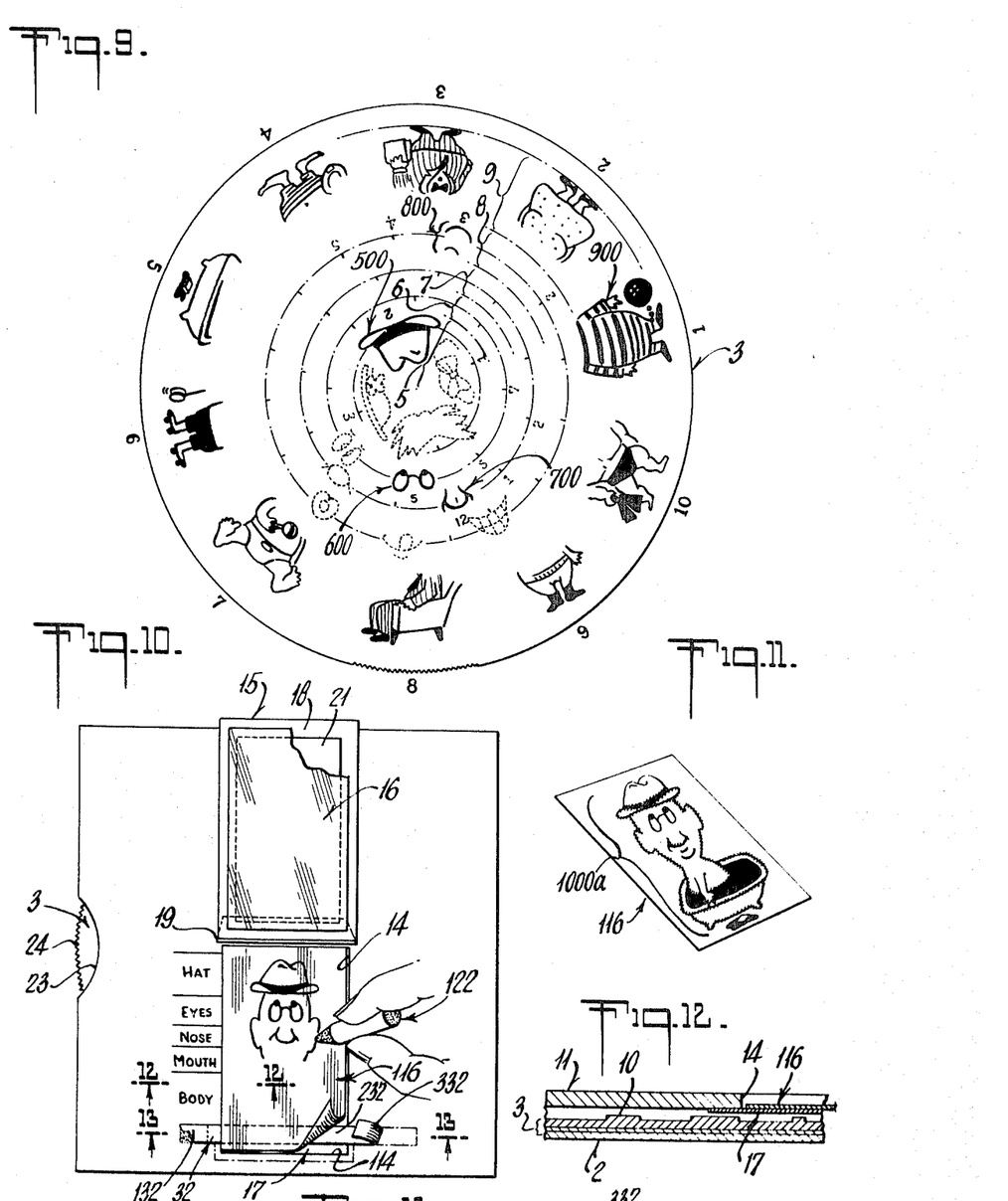
FIG. 9 is a plan view of the lands-bearing face of the rotary disk of FIG. 8, illustrating thereon the various coaxial circular zones thereof that are provided with classified groups of successive image portions that are more fully illustrated in the five charts of FIG. 7.
FIG. 10 is a top plan view of the embodiment of FIGS. 1 to 9 incl., modified only with respect to an addition thereto of a transverse peeling strip that can be laid across the window opening beneath a nested display sheet to facilitate lift of the latter there-out-of, such display sheet desirably being opaque and having developed progressively thereon a composite image by the use of one or more marking instruments, such as colored crayons, with such action being illustrated therein.
FIG. 11 is a perspective view of such image-bearing opaque sheet after the progressive development thereon of the composite image.
FIGS. 12 and 13 are enlarged sectional details, with parts broken away, taken respectively on lines 12—12 and 13—13 of FIG. 10.
Figure 13:
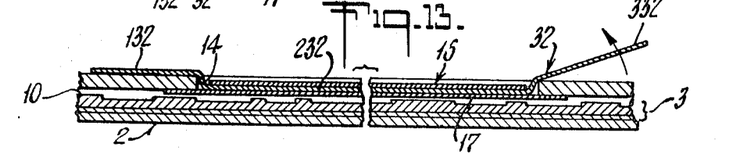

As a guide to the operator suitable index or indicator means may be provided, and for this purpose the bottom surface of the base plate may carry five panels (I), (II), (III), (IV) and (V) (see FIG. 7), one for each zone, subdivided into a plurality of sections in each of which is depicted one of a plurality of replicas of the differing images producible by the individual lands in the particular disk zone associated therewith, with each section replica identified by a certain indicium or indicator that is matched with or keyed to a like indicium or indicator carried by the back face of the rotary disk, or the indicator disk 27 carried on the bottom face of the latter (see FIG. 8), in alignment with the particular land on its top face that will produce that image. The bottom surface of the base plate may also carry a composite image 30 that generalizes the producible images of people caricatures, with this generalizing composite image marked off in transverse or horizontal zones or areas similar to those which may be borne on the display sheet 16 or its protective cover sheet 21, each such horizontal area having a sight aperture or port 28 therein in which may be viewed in any particular rotary position of the disk one of the indicia or indicators of the rotary disk that are associated with the lands of the one zone of the latter which will effect the reproductions of the replicas associated with that zone. Each of these horizontal zones or areas and its sight aperture may also be tied to the particular panel of depicted replicas by a guide line or arrow, as shown in FIG. 7, and the lands in the different circular zones of the disk may be radially staggered with those in the adjacent or all of the other circular zones, so that the indicia or indicators carried on the back of the disk for any particular circular zone will be individually exposed to view in the sight aperture or port for this zone while those of adjacent zones are hidden, so as to avoid possible confusion.

In operation of the FIGS. 1 to 9 incl. device or assembly, with the display sheet carrying frame 18 and this sheet 16 covering the window opening 14, the manipulator may, be way of example, develop progressively on the display sheet the desired composite image 1000 (FIG. 1) by proper use of the index means and the pressure applying means 22. For example, he may turn the assembly or device upside down and select a choice from the panel (I) of head top or hat panel replicas, such as replica "2." He then manually will rotate the lands-bearing disk 3 until the indicium or indicator "2" that is associated with the selected replica appears in the proper sight aperture or port 28. This manual rotation of the disk 3 constitutes guided lateral motion of the first lands-bearing circular zone 5 of this disk across the backing surface area beneath the window opening 14 that aligns the so-selected one of the series of pressure-applying lands 500 borne in this disk zone with the top horizontal area of the display sheet 16. The operator then will turn the device back to its face up position. With the rubbing block or instrument 22 he then will rub over the top area of the display sheet 16 to press the latter down firmly over the area of the underlying wax-coated web 17 aligned with this display sheet area and the face of the disk land 500 that is located therebeneath, i.e., the land face which backs the flexible web in this area. This pressure is localized by this underlying land face for adhering to the web 17 that portion of the display sheet 16 that overlays the land face so as to produce or develop on the display sheet an image of the latter, i.e., a replica of the design of this land face. This operation is then repeated successively with respect to the remaining four zones, so as to develop progressively on the display sheet 16 the composite image 1000 that is composed of individual images of the designs of the faces of the lands 600, 700, 800 and 900 which are successively selected and reproduced in this manner. The operator may then erase this so developed or assembled composite image 1000 for reuse of the device by swinging the window frame 18 upwardly to separate the display sheet 16 from the wax-coated web 17 in the adhered areas. If desired the upward swing of the window frame 18 may be limited by suitable stop means, such as bracket 31 indicated in FIG. 5.

It may be desired to provide on a single rotary disk only such lands as are carried in a single zone, or zones less than the total number indicated for the rotary disk of the FIGS. 1 to 9 incl. embodiment, and to carry the others on an additional disk, or a plurality of supplemental disks, rotatably supported on the same base plate, with the rotary axis of the additional disk, or the rotary axes of the supplemental disks, spaced laterally from that of the first disk. For example, the first rotary disk may carry the two circular series of lands which are respectively designed for productions of the head tops and the eyes with these series being rotated respectively beneath the top and next lower horizontal areas of the display sheet. In this event a second lands-bearing disk may be rotatably mounted about an axis below the hinged frame, i.e., in a laterally lower extension of the carrier structure, with three circular zones thereof respectively being rotatable beneath the remaining three horizontal areas of the display sheet. One of these three circular zones of the second lands-bearing disk will carry the nose-simulating lands, another will carry the mouth-simulating lands and the third will carry the body-simulating lands.

In so operating the FIGS. 1 to 9 incl. embodiment of the assembly or device having a single lands-bearing rotary disk, or a plurality thereof, the translucency of the display sheet 16 that is overlying the window opening 14 provides sufficient opacity to block from clear view with appreciable efficacy at a point of observation outward of the outer surface of the display sheet of any otherwise readily observable underlying surface or elements, such as the wax coating on the web 17 and this web.

If the Magic Slate sub-assembly employed in the FIGS. 1 to 9 incl. embodiment is of the mobile paste envelope form described in lines 8 to 34 inclusive of column 2 of the identified U.S. Pat. 3,279,100 the planar envelope, which carries the load or layer of mobile paste or viscous liquid of appreciable opacity, that is marginally supported by a movable or swing-away frame for covering the cover plate window, is substituted for the previously described flexible display sheet, its protective transparent cover sheet, and the underlying wax-coated web. In such case the transparent or see-through top wall sheet of the envelope, which is flexible, and the underlying windowing layer of mobile paste or viscous liquid together constitute the functional equivalent of the flexible display sheet, so as to serve as the depressible, flexible, display planar means which is to display developed markings. The flexible, transparent or see-through, bottom wall sheet of this envelope constitutes at least an element of the planar backing means which is supported or reinforced by the underlying upper or outer faces of the pressure-localizing lands. If color contrasting appreciably with the coloration of the seemingly opaque mobile contents of the envelope is to be embodied in any element below the pressure defined windows that are developed in this envelope structure, in order observably to accentuate such windows and their shapes or designs it may be applied to the exterior bottom face of the bottom wall sheet of the envelope or incorporated in this sheet. As an alternative, the flexible bottom wall sheet of the envelope, if of see-through or transparent character, and the pressure-localizing lands may be intervened by a supplemental colored sheet. This supplemental colored sheet must, like the envelope bottom wall sheet, be flexible so that the two together constitute a flexible, plural-ply planar structure that serves as the planar backing means. Such flexible, plural-ply planar structure is to be firmly supported at least at the time of use in localized areas of applied pressure with the upper or outer faces of the relatively rigid, underlying lands performing this supporting and the pressure localizing functions, as is the wax-coated, flexible web 17 of the FIGS. 1 to 9 incl. embodiment. Also, such contrasting coloration seemingly may be imparted to the flexible bottom wall sheet of the envelope in the lands-defined localized areas thereof by color in or on the underlying lands faces. Further, since an optical sense of certain color is attributed to a light source by the wavelength of the rays reflected from or transmitted through that source to the observer's eye the backing structure beneath the windowed areas of the envelope may be given the appearance of being dark, or black (which is a distinctive color as is white), by being protectively screened or of a physical character as to have a minimum reflective power, for contrast with a different coloration provided by the mobile contents of the envelope that surrounds the windowed areas. Advantage may be taken of such facts by assemblies that will back light the localized windowed areas of the display means. For example, the carrier structure may include a chambered housing in which the lands-bearing member is movably housed. Such backlighted embodiment will include a see-through backing means either intervened between the planar display means and the lands-bearing member or underlying the latter, and it may bear or have incorporated therein coloring material which will pass light rays and impart thereto a desired tint. A source of light will be provided, either in a form to be located within the housing chamber with the latter preferably isolated from the surroundings of the assembly, or as a light-transmitting passage leading to the interior of the chamber, and such light source will be so located that light rays emanating therefrom will pass through the colored backing means to and through the windowed areas of the display means. If such light source and the display means are intervened by the lands-bearing member the latter will be of light-transmitting material, such as transparent; and such light-transmitting, lands-bearing member may embody the tinting coloring material to serve as the backing means so as to make unnecessary the use of separate tinted backing means.

In the event that the pressure-localizing member or disk is rotatably supported above the depressible, flexible, display planar means, in a manner hereinafter indicated in FIGS. 20 to 23 incl., and this display planar means is in the form of such flexible, mobile paste loaded envelope, the bottom wall sheet of the envelope is reinforced or supported by an area of the flat top surface of the back plate to serve as a backing surface. This backing surface area may be provided with coloration, either as a color coating or color incorporated in the back plate material to be observed through this envelope back wall sheet, which contrasts distinctively with the coloration of the mobile paste that has appreciable opacity. When the pressure-localizing member or rotary disk so overlays the top display wall sheet of the envelope, and the faces of the lands carried thereby face down toward this top display wall sheet such inverted lands faces serve not only as the pressure-localizing means but also as the means for applying the pressure in the areas that are localized thereby. As is indicated hereinafter with respect to FIGS. 20 to 23 incl., the markings that are so developed on the planar display means of such an envelope embodiment in the operation thereof are observed either through the overlying, transparent, lands-bearing, pressure-localizing member or disk, or directly when this member or disk is removed or swung away from above the top face of this envelope.

As is indicated in the FIGS. 10 to 13 incl. variation of the FIGS. 1 to 9 incl. embodiment the latter may be employed readily to produce a permanent record of any composite image producible thereby. For example, if the rectangular window frame 18 is swung back completely to uncover the rectangular window 14 in the top plate 11 (in the absence of the bracket 31 of FIG. 5) a rectangular, flexible and opaque sheet 116 of paper which will seat down in the window socket, preferably with a relatively close but loose fit therein, may be dropped thereinto to serve as the display sheet. This sheet 116 of paper may be of conventional bond stock primarily intended for use as letter paper. When it is so placed in the window socket the side edges and right angled corners of the latter and the underlying web 17 together serve as means movably to support this display sheet in the assembly while guiding placement thereof over the window-defined area of the backing surface for temporarily holding it in such relative position. The tackiness of the wax coating on the web 17 also supplements this temporary holding action since it causes adherence thereto of the back of such display sheet in the areas where pressure is applied over the underlying lands. In order to facilitate removal of this display sheet 116 from the window socket, after a composite image has been developed or recorded thereon in a manner hereinafter described, a suitable device of structural simplicity may be provided. In this FIGS. 10 to 13 incl. embodiment such a device is illustrated, by way of example, as being a flexible peeling strip 32 that has one end 132 anchored to the face of the cover plate 11 adjacent a side margin of the window 14 near the lower edge 114 of the latter, with the free medial portion 232 of this strip extending down into and across the window adjacent this lower window edge and with its free end 332 extending thereoutof at the opposite side of the window. The lower edge of this display sheet 116 is laid over the mid-section 232 of this peeling strip as the sheet is placed into the window socket, so that this strip mid-section underlays the sheet lower edge while the composite image is developed upon the sheet top face. The opacity of this display sheet blocks any view with efficacy at a point of observation outward of the display sheet and the window socket of the backing surface and any otherwise readily observable surface and elements which may intervene this sheet and the backing surface. The parts of the composite image are assembled progressively on this display sheet as a permanent record by the use of any suitable marking instrument 122 that will apply pressure and visible marks thereto simultaneously, such as a crayon of any selected color, a lead pencil, and the like. Since the face of the land that is located beneath the wax-coated web 17 and display sheet 116 at any one time provides localized support therefor as the marking instrument 122 is rubbed repeatedly over the display sheet the marks made by the rubbing will be visibly accented in the land-supported area ultimately to develop on the display sheet an image of the design of the land face. A repetition of this action with the successive use of the different lands in the different zones of the pressure-localizing, lands-bearing disk 3 will progressively produce or assemble the desired composite image. After completion of the production of this permanent composite image record the display markings constituting it are removable from the assembly or device by lifting out of the window socket the display sheet 116 which bears these markings. This removal action is facilitated by the above-described use of the peeling strip 32. The adherence developed between the back of this permanent record display sheet 116 and the tacky wax coating of the web 17 in the areas that lay over the faces of the lands at the times when images of these lands faces are recorded on the sheet does not appreciably resist peeling separation thereof. This permanent record display sheet is as readily separated from the wax-coated web in a peelable manner as is the translucent display sheet carried by the swinging frame 18, and neither the permanent record sheet nor the wax coating of the web are damaged thereby.

A similar permanent record result may be attained with the swingable frame 18 and its translucent display sheet 16 covering the window. In this case the opaque display sheet 116 on which the permanent record is to be produced is seated within the margins of the frame 18 outward of the translucent sheet 16 carried by the latter and upon the flexible protective transparent sheet 21 covering the flexible translucent display sheet. The frame and the transverse closure of the opening therein by the translucent and protective sheets thus form support and guide means for the permanent record display sheet 116 temporarily to hold it in a desired position relative to the backing means portion which is located underneath the carrier structure window 14 and to the intervening lands-bearing member or disk. The pressure applied by the marking instrument 122 is localized at the face of each land which is located beneath the flexible stack of the wax-coated web, the translucent display sheet 16, the covering protective sheet 21 and this separate permanent record display sheet 116.

It will thus be appreciated that, in the FIGS. 10 to 13 incl. embodiment or the further variant thereof described immediately above, the means which movably supports the pressure-localizing rotary disk on the base plate of the carrier structure is of a type permitting successive and guided lateral motion of each of the lands-bearing zones of this disk across a certain transverse area of the removably supported display sheet successively and selectively to align each of a chosen plurality of the series of pressure-localizing lands with successive individual portions of the display sheet. This combination of these elements of the assembly thus permits each chosen land to be selectively aligned with one of these sheet portions and each such aligned land and sheet portion to be pressed together by suitable pressure-applying and image-developing means, which develops on each such portion of the outer exposed face of the display sheet an image of the face of the land that is aligned therewith as such alignments are successively effected, so that there is progressively assembled or developed on the display sheet a composite image 1000*a* which includes individual images of the designs of the faces of these lands.

Figures 14, 15, 16:
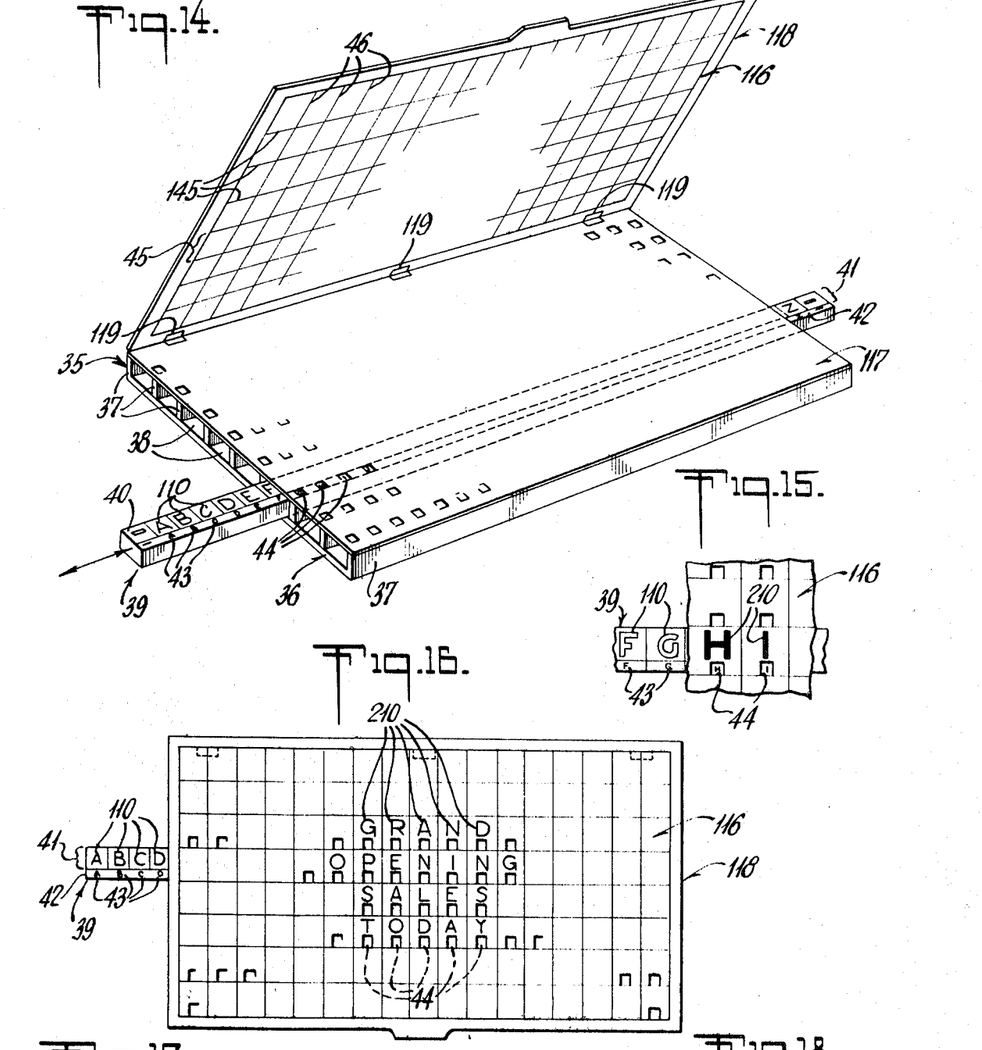
FIG. 14 is a perspective view of another modified form of the device of the present invention, with the display planar member thereof being illustrated in its swung-away position.
FIG. 15 is an enlarged plan detail, with parts broken away, of the carrier structure and lands-bearing means of the device of FIG. 14, illustrating guidance indicator means thereof.
FIG. 16 is a plan view of the device of FIG. 14 illustrating operation thereof in the progressive development upon its display planar member of a composite message.

In the FIGS. 14 to 16 incl. embodiment it is indicated that the relatively rigid carrier structure may include a base 35 in the form of a flat plate 36 with its upper or outer face supporting a plurality of parallel and transversely-spaced, upstanding ribs 37 to define therebetween a plurality of straight, parallel channels 38 that are preferably of substantially equal width. The top edges of these ribs 37 support in any suitable manner, such as by means of cement, a flexible web 117 preferably carrying on its top or outer surface the tacky film. This web may be formed of flexible woven fabric and may be of any suitable distinctive color, e.g., black. The tacky film may be transparent wax applied to the top surface of the fabric. This base 35 supports a movable rectangular frame 118, which may be connected along one edge of the former by means of suitable hinging elements 119. This rectangular frame 118 carries a translucent plastic sheet which is to serve as the depressible, flexible display sheet 116, which may, if desired, be protectively covered by a transparent flexible sheet. When the frame 118 is swung down to lay over the wax-coated web 117, to the FIG. 16 position, this web and the translucent display sheet 116 will be intervened by a relatively small space. If the color of wax-coated web 117 is, by way of example, black, the display sheet may appear to be of a distinctively different color, such as milky white, for contrast so that when any adhered surface of the black web can be seen through the seemingly white display sheet the black image of the web in the adhered area will be readily discernible by the color contrast.

In the FIGS. 14 to 16 incl. embodiment the pressure-localizing member may be in the form of a slide 39 which is receivable for longitudinal sliding action in any one of the parallel channels 38 defined between the ribs 37. Preferably the face or top surface 40 of this pressure-localizing slide member 39 is provided with two longitudinal zones with one 41 thereof occupying the major portion of the face area and the other 42 occupying a minor portion along one edge. The major portion face area bears a pattern of spaced pressure-localizing raised lands 110 facing upward toward the back face of the wax-coated web 117, and thus toward the back of the display sheet which is laid over the latter. A small space intervenes the faces of these raised lands 110 and the back of the flexible wax-coated web, so that each zone of the latter between the parallel lines of support at the rib top edges will permit this web zone to be flexed downward by a moderate amount of applied pressure that will not hazard web damage while causing the bottom face of the web to be securely backed by the face of any raised land 110 on the slide that is beneath the point of application of such pressure.

Let it be assumed that the spaced, pressure-localizing raised lands 110 in the slide face zone 41 are in the form of upper case letters of the alphabet and that the minor edge zone 42 of the face of the slide carries a series of indicators or indices 43 identifying these raised lands, such as smaller letters of the alphabet with each transversely aligned with the upper case, raised land letter that is mentally associated therewith. As is indicated in FIG. 14 a series of small apertures or ports 43 may be formed in one edge of the zone of the wax-coated web 117, which forms a cover for the channel in which the slide member is slidably received, with these ports spaced apart a distance equal to the spacing of the lands 110. Let it also be assumed that a face of the translucent display sheet 116 is desirably sub-divided into a plurality of longitudinal zones or areas 45 by a plurality of parallel lines 145 marked thereon and that each such zone is subdivided into successive portions by a plurality of crossing transverse lines 46. The spaces between these longitudinal lines 145 coincide with the spaces between the tops of the ribs 37, and the spaces between the transverse lines coincide with the spacing of the raised lands 110, so that when the display sheet 116 covers the wax-coated web one of the square areas delineated on this display sheet will be underlaid by one of the lands of the slide 39 when properly positioned by the guidance afforded by the sight ports 44 and indicators 43. This exhibitor assembly may be employed to develop on the display sheet 116 a composite image in the form of a message which includes individual images 210 of the designs of the letter lands 110 which are progressively assembled thereon.

In operation of the FIGS. 14 to 16 incl. embodiment the operator may desire to spell out on the translucent display sheet any desired message such as, for example, "GRAND OPENING SALES DAY" (as is illustrated in FIG. 16), and that each word of this message is to be individually developed in one of the longitudinal zones or areas 45 of the display sheet. The slide 39 will be inserted in the channel 38 which underlays the longitudinal zone in which the word "GRAND" is to be developed. While the opacity of the translucent display sheet 116 is sufficient to block a clear view with appreciable efficacy at a reasonably distant point of observation outward of the top face of this sheet of the wax-coated web it will preferably be of such a limited see-through character as to allow the observer upon close inspection dimly to recognize at a relatively short distance outward of the display sheet the series of index apertures or ports 44 that are formed in the underlying web 117, as well as any of the smaller index letters 43 on the slide 39 that will be exposed in these index apertures or ports for guiding recognition, or in any other practical way that may occur to the operator. In any event, the operator selects the particular portion of the longitudinal zone 45 of the display sheet 116 in which he wishes to develop the image of a particular word of this message, after slidably inserting the slide 39 in the proper channel 38 beneath this web zone, selects the particular subdivision portion of this zone in which he wishes to develop an image of the first letter of this word, such as "G," he looks into the index port 44 that is aligned with this chosen display sheet portion and moves the slide until he sees in this port the index letter "g." He then rubs over the selected area portion of the translucent display sheet 116, so as to press it and the underlying area of the web 117 firmly down upon the face of the raised land of the letter "G" that he has aligned therebeneath. By rubbing this portion with a suitable pressure-applying instrument, such as a block, he will cause the back of this portion of the display sheet to be adhered to that portion of the wax coating on the web 117 which intervenes the face of this land and the selected area portion of the display sheet 116, for temporary adherence of the back surface of the latter to the web in the area of the land face of the letter "G." This windows the translucency of the display sheet 116 to develop on the selected area portion of the display sheet an observable image of this selected letter in the black color of the web. He then repeats the operation with suitable sliding adjustment of the slide 39 for adding thereto in the same longitudinal zone 45 the remaining letters of the word, and those of any additional words, which he wishes to develop in this longitudinal zone. Thereafter, he withdraws the slide 39 from this channel 38 and slides it into the next channel that is located beneath the next longitudinal zone of the display sheet in which he wishes to develop an image of the next word, or words, and repeats the operation until he has completely developed on the display sheet the entire message desired, shifting the slide from channel to channel and using the index means in the indicated manner for progressive development of the images of the successive letters of the words and the assembly of these words into the desired message. Of course the operator may, if he wishes, employ a separate slide for each of the plurality of channels he uses.

Figure 17:
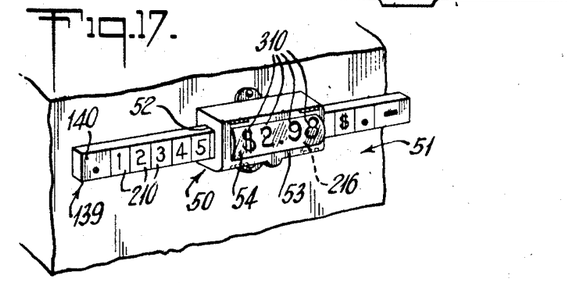
FIG. 17 is a perspective view of a modified form of the embodiment of FIGS. 14 to 16 incl. employable as a unit price marker.
Figure 18:
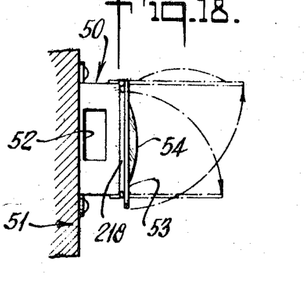
FIG. 18 is an end elevation of the structure shown in FIG. 17, illustrating in broken lines swing-away of parts thereof to erase a message that was progressively developed therein.

A variant of the FIGS. 14 to 16 incl. embodiment is illustrated, by way of example, in FIGS. 17 and 18 which demonstrates the usefulness of such an assembly where the pressure-localizing member has but a single lands-bearing zone and requires no separate provision for index guiding means, with the relatively rigid carrier structure providing a single path of movement for longitudinal translation of this pressure-localizing member. Let it be assumed that the relatively rigid carrier structure is in the form of a small, longitudinally slotted casing 50 adapted to be fastened to or mounted upon a unit of merchandise, or a display 51 of a plurality thereof. This carrier structure 50 is so constructed as to provide suitable backing means, and the support of a wax-coated web (not shown) thereon, between which is defined a single slide-receiving channel 52. A suitable rectangular frame 218 may be hingedly connected to this carrier structure casing 50 along the bottom side thereof with this frame supporting a translucent plastic display sheet 216, which may be marked off transversely into successive portions in each of which is to be displayed an image of the face of one of the raised lands of a series slidably received in the channel 52. The face of a slide 139 may have its face zone 140 marked off into succeeding face portions with each bearing one of a plurality of lands 210 having faces respectively shaped in the designs of the numerals (1) to (10) inclusive and (0), as well as the dollar sign ($), which may be assembled in a selected successive order to indicate a certain sale price. The top side of the carrier structure casing 50 may have hinged thereto another rectangular frame 53 to be swung down over the upwardly hinged frame 218 which carries the flexible translucent display sheet 216, and this second frame may be equipped with a magnifying lens 54 to make readily readable the image 310 of the price developed upon the underlying display sheet. This embodiment may be operated by swinging the lens-bearing frame 53 back away from the infolded frame 218, and the desired price markings may be developed on the now uncovered display sheet 216 progressively by properly manipulating the slide 139 longitudinally in the channel 52 and causing by the application of pressure to successive portions of the uncovered display sheet the development of successive images which together convey the message of the price. As in preceding embodiments, this message may be erased for reuse of this price marker device by swinging the frame 218 outward for separating its display sheet 216 from the underlying wax-coated web, after the lens-bearing cover 53 has been swung up, as is indicated in broken lines in FIG. 18.

Figure 19:
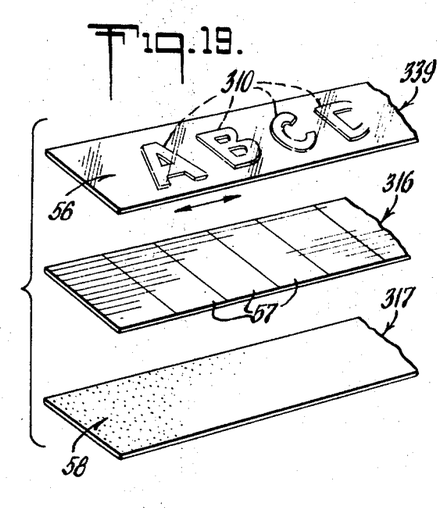
FIG. 19 is an exploded fragmentary perspective of the basic elements of a variant of the assembly of FIGS. 14 to 16 incl., illustrating that the lands-bearing or pressure-localizing strip may be located outward of the display planar member with its lands facing toward the latter that, in turn, is interposed between the wax-bearing dark strip and the pressure-localizing strip, when the latter and its lands are of see-through character so as to simplify the guidance indicator means.

In FIG. 19 are illustrated in schematic strip manner the basic elements of an embodiment of the FIGS. 14 to 16 incl. type, which will simplify the guidance indicator means need. As is therein indicated the lands-bearing member 339 may be the outwardly positioned member which is located nearest the point of observation, with it underlaid by the seemingly opaque and windowable, flexible, display planar member 316, that is superposed above the wax-coated backing means 317. This lands-bearing member 339 is translatable longitudinally relative to the display member 316 and its raised lands 310 (which may have faces in the shapes of the letters of the alphabet) are mounted on its under surface, with their pressure-localizing faces opposed to the display member, and this lands-bearing member and its lands are of a clearly see-through character, e.g., transparent. This lands-bearing member 339, while being relatively stiff to have a certain orientation when flexing pressure is not applied thereto, has some elastic flexibility, at least in the sections intervening the lands 310, to permit localized temporary deflection downward to contact of the display member 316 by the face of any selected one of its lands when localized pressure is applied to the upper surface 56 of this lands-bearing member above the selected land. The upper surface of the display member 316 may be subdivided into localized areas 57 by spaced apart lines, and its under surface is opposed to the wax coating 58 on the upper surface of the backing means member 317. Manipulation of the lands-bearing member 339 relative to the display member 316 and the successive pressing of each of a selected plurality of the lands 310 against selected areas of the display member may be of the same general nature described above with respect to the operation of the FIGS. 14 to 16 incl. assembly. For example, the operator will select one of the lands 310 that has a face which he wishes to image in a particular area of the upper surface of the display member 316 and translate the lands-bearing member 339 to alignment of this land with such land. Since he can see the localized areas 57 through the transparent lands-bearing member 339 and the lands of the latter he can easily attain such desired alignment by the visual guidance afforded. He then applies pressure to the upper surface 56 over this selected land to deflect the latter down to contact of its face with this display area to window it with an image of this land face by forcing the under surface of this area into adhering contact with the wax coating 58. He then repeats the operation with other, subsequently-selected, lands and display areas successively, progressively to develop the desired message by the windowing of the display member. This message, which is spelled out by such windowing, is then readable through the transparent lands-bearing strip 339, or the latter may be removed for such reading directly.

Figure 20:
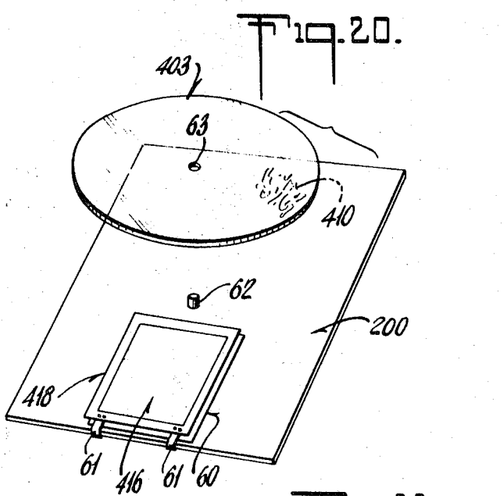
FIG. 20 is a perspective exploded view of another modified form of the assembly of FIGS. 1 to 4 incl., illustrating another embodiment of the location of the rotary lands-bearing disk outward of the display planar member with simplification of the guidance indicator means, the rotary disk and its lands being of see-through character for this purpose and the disk having some flexibility since it serves as the pressure receiving element.
Figure 21:
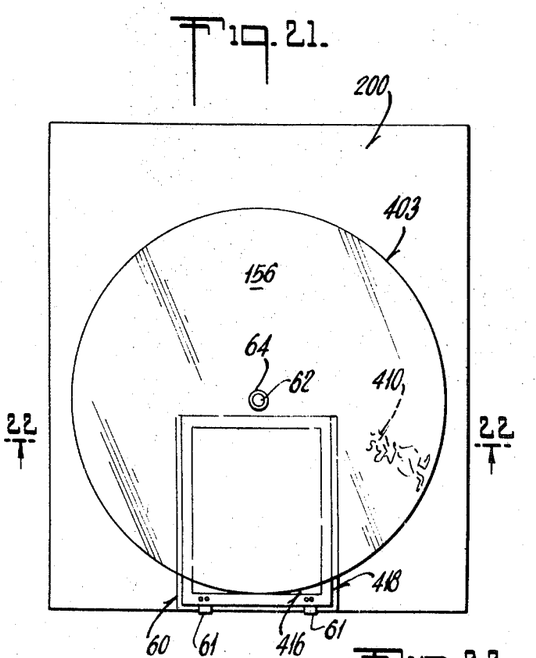
FIG. 21 is a plan view of the assembly of FIG. 20.
Figure 22:
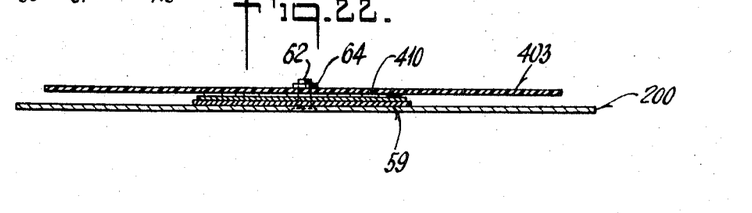
FIG. 22 is a sectional view to enlarged scale, taken on line 22—22 of FIG. 21.
Figure 23:
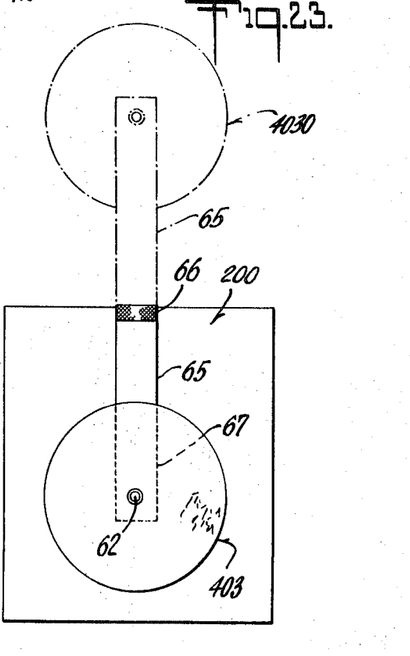
FIG. 23 is a plan view of the carrier plate and rotary lands-bearing disk of the FIGS. 20 to 22 incl. embodiment, proposing a variant of the pivotal mount of the disk that permits it to be swung away for directly viewing images developed on the display planar member (omitted from this view)

The FIGS. 20 and 21 embodiment illustrates a variant of the FIGS. 1 to 9 incl., and 19 embodiments further to demonstrate an intervening location of the depressible and flexible translucent display sheet between the wax-coated face and the pressure-localizing member, which may be in the form of a rotary disk 403 similar to that illustrated at 3 in the FIGS. 1 to 9 incl. embodiment. The carrier structure may comprise chiefly a relatively rigid backing or base board 200 of stiff cardboard, or the like, with the top face thereof constituting a backing surface. A rectangular area 60 of this backing surface may be provided with a suitable distinctive color, which may be painted thereon as a coating or the color may be incorporated in base board material, with this colored area suitably covered by a tacky wax film 59 that may be transparent. A rectangular frame 418 may carry the translucent, flexible display sheet 416 which is of a color contrasting appreciably with that of the backing surface area 60. Since this translucent display sheet 416 is to be separable from the wax-coated area 60 it may be suitably hingedly connected along one margin to the backing surface adjacent a margin of the wax-coated area, such as at 61, so that it may be swung away from the latter or, alternatively, thereover for disposing the display sheet in closely spaced relationship to the wax coating. The pressure-localizing disk 403 may be of limited elastic flexibility and has its lands-bearing face located on the underside thereof so that the faces of these lands 410 are opposed to and face toward the display sheet 416 in underlying relationship. The pressure-localizing disk 400 is rotatably mounted on the base board 200 by any suitable means, which may be in the form of a pivot pin 62, fixedly mounted on the top of this board and a central hole 63 in the disk in which this pin is freely received for relative rotation. For the purpose of index guiding and possible viewing therethrough of the progressively assembled composite image on the top or outer surface of the display sheet 416, this lands-bearing disk 403 preferably may be formed of transparent or see-through plastic, and the lands 410 may be embossed thereon. Thus, whenever a selected land 410 in any particular circular zone of the rotary lands-bearing disk 403 has been aligned with a chosen area of the depressible flexible display sheet 416 the face of such land may be caused to apply localized pressure in an area of the display sheet so as to flex this localized area of the display sheet downwardly to adherence with the underlying wax coating 59 in a design duplicating the contour of the face of the land. Such imprinting pressure may be applied to the back of the lands-bearing disk 403, i.e., the exposed top side 156 thereof, above the selected land 410 which is aligned with the chosen portion of the display sheet, such as by pressing down thereon with one's hand.

In order to avoid interference with the effectiveness of such downward deflection of the disk-carried land 410 the lands in the various circular zones on the underface of the disk 403 may be suitably separated to accommodate the thickness of the frame which supports the display sheet, or this frame may be omitted and the display sheet itself may be fastened along one margin to the backing surface for peeling it away from the wax coating 59 by curling it back. For this purpose, such unframed display sheet may have a lift tab provided on its margin opposite the edge which is fastened to the backing surface. Alternatively, the transparent plastic disk 403 may be of such flexibility as to permit downward flexure of any land bearing section thereof with respect to the remainder of the disk.

While a variety of means for rotatably guiding the circular rotation of the lands-bearing disk may readily occur to one it may be in the simple form of the fixed pin 62 and receiving hole 63, and the top of this pin may carry a split ring fastener 64 to secure the rotary disk thereto in a relatively permanent manner. However, if the fastener 64 is omitted the disk 403 may be lifted off of the pin 62 for permitting direct viewing of the underlying, windowed display sheet 416. Further, as will be seen in FIG. 23, the rotary disk 403 may be rotatably supported upon the base board 200 by a flip strip 65 having one end 66 hingedly connected to a margin of the backing board above the Magic Slate sub-assembly, comprising the color-backed wax coating 59 and the translucent display sheet 416 (FIG. 22), and with its other end 67 pivotally supporting the center of the lands-bearing disk on its axis at a point laterally above the Magic Slate sub-assembly. Thus this disk 403 may be swung upward and away from the Magic Slate sub-assembly, to the position indicated in broken lines at 4030, after imprinting upon chosen areas of the display sheet 416 complementary images of the faces of selected lands in different circular zones of the disk. This provision for permitting the lands-bearing disk to be swung out of a position of covering the display sheet 416 permits the latter, or the frame which supports it, to be swung away from the wax coating 59 for peeling the display sheet therefrom in the areas of adherence thereto for erasure of the composite image assembled or developed on the display sheet, so as to permit reuse of the assembly or device.

The FIGS. 24 to 27 incl. embodiment illustrates a simplified form of the assembly depicted in FIGS. 1 to 9 incl. and it demonstrates the use thereof in assembling on a display sheet a composite image of a plurality of pleasing designs which respectively may simulate the fascinating shapes of different snowflakes and other pleasing designs. This FIGS. 24 to 27 incl. embodiment may include a relatively rigid carrier structure in the form of an appreciably stiff, rectangular plate 2000 of cardboard to serve as a base board. This base plate or board 2000 may be overlaid with a shimming plate 120, of cardboard, or the like, and marginally anchored to the former, such as by adhesive. This shim plate 120 has a relatively large circular hole 130 therein, and a gap 70 in one side margin thereof. This hole 130 is converted into a circular chamber by being overlaid with a flexible web 517 and a relatively thin cover sheet 511 suitably anchored or cemented together marginally to the marginal edge of the shim plate 120. The relatively thin cover sheet 511 has a relatively large circular hole 114 formed therein to serve as a window, in which is exposed a circular area 71 of the top face of the flexible web 417. This exposed circular area 71 of the top face of the flexible web is coated with a tacky coating of wax 159, and together they serve as the backing means. A pressure-localizing member, in the form of a rotary disk 503, may be rotatably mounted beneath the circular wax-coated web 517, and it may be pivotally mounted to the base board 2000 at its axis by a pivot pin 125, or rotatably confined in the circular chamber 130 provided between the base board and the wax-coated web 517, as well as the cover sheet 511 overlying the latter. In the gap 70 of the shim plate 120 is exposed a sector 72 of the marginal edge of the disk 503 to access of and engagement by the operator's fingers for effecting the disk rotation.

The wax-coated web or backing means 517, with its wax bearing face 159 that serves as the backing surface facing upward or outward, is overlaid by a rectangular frame 518 that is hinged by any suitable means, such as flexible pieces 161 of adhesive tape, along one margin to the relatively rigid carrier structure comprising the base board 2000. This hinged frame 518 carries a depressible, flexible display sheet 516 which is of a color that contrasts with any colors that are embodied in the wax-coated web 517. For example, the display sheet 516 may be a seemingly white flexible sheet of plastic which is of sufficient opacity as to block a clear view with appreciable efficacy, from a point of observation outward of or above the display sheet, of the wax-coated web 517 while permitting at a close range limited view therethrough of this web. This limited see-through characteristic of the display sheet 316 is useful in simplifying the index means for guiding selections of raised lands on the rotary disk 503 for alignment with chosen portions of the face area of the display sheet. For example, as will be understood from FIGS. 26 and 27, the lands 510 carried by the upper face of the rotary disk 503 may be arranged in two circular zones 505 and 509 subdivided into portions by radii (a few of which are indicated in dot-dash lines at 75 in FIG. 26). A pattern of the face of this disk may be provided on a separate guidance sheet (not shown) with the selectors thereof successively numbered. Exterior of the outer circular zone of the disk the latter may bear a similar series of successive numbers, such as "1" to "12" inclusive (indicated at 76) and the top sheet 511 and the underlying web 517 may be provided with a plurality of aligned sight apertures or ports 77 arranged on a circle of equal radius and spaced apart the same distance as are the numbers 76.

Figure 24:
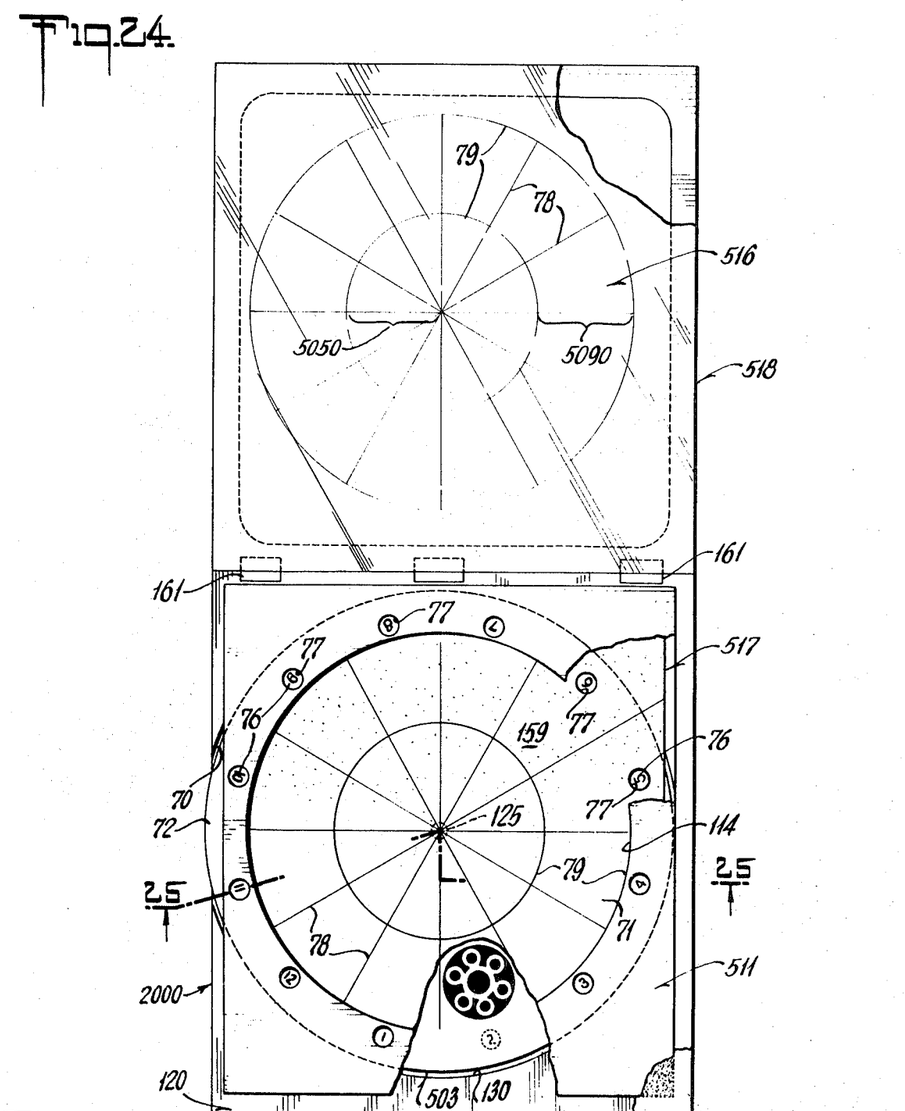
FIG. 24 is a plan view of a further embodiment of the exhibitor assembly, showing the planar display member swung up away from the carrier structure, to uncover the planar backing surface.
Figure 25:
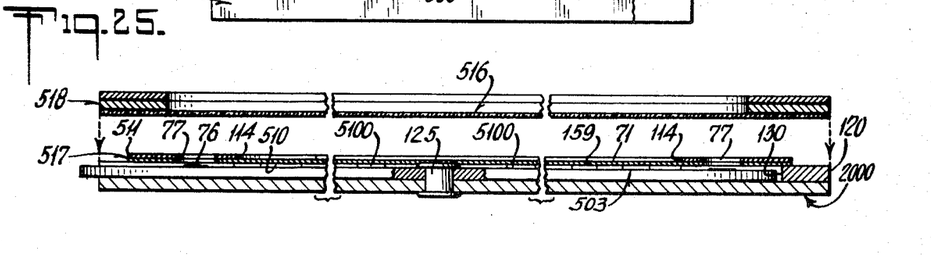
FIG. 25 is a cross-sectional view on line 25—25 of the assembly structure of FIG. 24, with parts in elevation and others broken away, taken with the planar display member shown as it is being swung back down to its operative position over the carrier structure and in a location of close approach to the latter.
Figure 26:
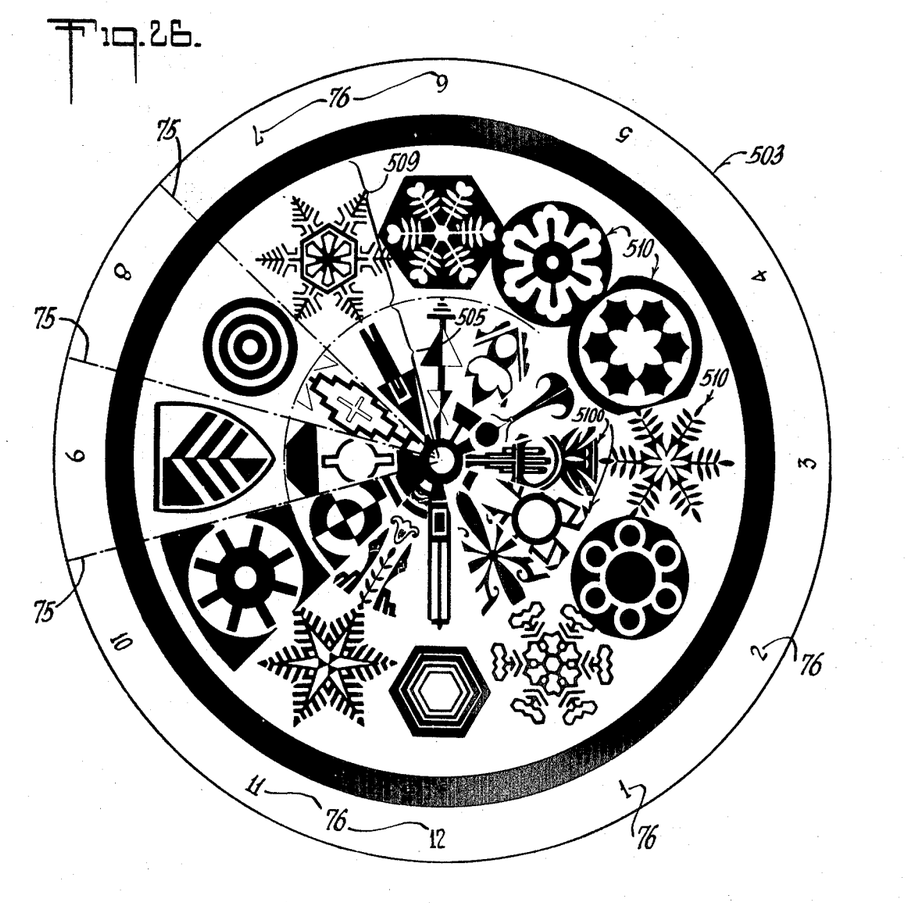
FIG. 26 is a plan view of the lands-bearing rotary disk embodied in the FIGS. 24 and 25 assembly.
Figure 27:
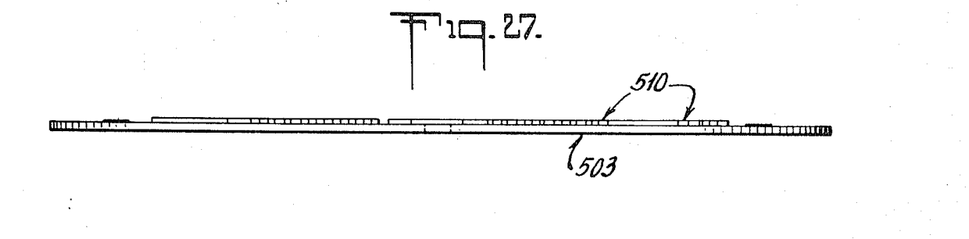
FIG. 27 is an edge elevational view of the lands-bearing rotary disk shown in FIG. 26.

The outer circular zone 509 of the disk 503, and this guidance sheet, may bear in its sectors a series of lands 510 having faces patterned in a plurality of differing designs, representative of different forms of snowflakes or other pleasing designs, and the inner circular zone 505 may bear a series of lands 5100 having faces of differing designs to complement those at 510. The movable display sheet 516 may be also provided with a pair of like parallel zones 5090 and 5050 similarly subdivided into sectors by similar radial and circular lines 78 and 79, as may the circular wax-coated face of the flexible web 517 (as shown in FIG. 24) so that any chosen portion of the face area of this display sheet will overlay in alignment the like portions of the underlying wax-coated web and the lands-bearing face of the rotary disk 503 which is rotatably mounted beneath the latter. It is to be understood that the black areas of the lands 510 and 5100 shown in FIG. 26 are the pressure applying faces thereof while the flanking white areas are depressions intervening these lands faces.

Let it be assumed, by way of example and to facilitate an understanding of the results producible by use of this FIGS. 24 to 27 incl. assembly or device, that each of the pair of circular zones of the upper face of the disk 503, the wax-coated web 517 and the display sheet 516 are sub-divided into twelve similar sectors, so that they are respectively positioned at clock face points. In operation of this FIGS. 24 to 27 incl. embodiment the operator may wish to develop at alternate locations a composite image of a certain outer zone design 510, which he selects on the guide sheet as being identified by the index number "2," and to intervene these repetitions with the snowflake design identified on the guide sheet by the index number "1." He may also wish to subtend the outer zone design at "2" with the inner zone design at "7" and the outer zone snowflake design "1" with the inner zone design "11." The operator will thus engage the exposed edge sector 72 of the rotary disk 503 and rotate it until its indicator numeral "2" is exposed dimly to view through the display sheet 516 in the sight port 77 at one o'clock. He will then apply pressure to the face of the display sheet 516 in the one o'clock sector of the outer zone 5090 there to develop an image of the first selected snowflake design "2." He may then rotate the disk until the disk indicator numeral "7" appears in the sight port 77 at one o'clock and apply pressure by rubbing this sector of the inner zone which is radially inward of the outer zone sector where he developed the first selected snowflake design, so as to combine in this entire two-zone sector the first selected outer zone design and the next selected inner zone design. The operator may then turn the rotary disk 503 back, dimly to expose to view through the display sheet the disk numeral indicator "1" in the sight aperture at two o'clock and apply rubbing pressure to this sector of the outer circular zone. He may then rotate the disk 503 to expose dimly to view through the display sheet the disk indicator numeral "11" in the sight aperture at two o'clock and develop in the inner zone sector of the display sheet radially inward of this second snowflake design which he had developed at two o'clock for association therewith. Again the operator may rotate the disk until the disk indicator numeral "2" is exposed to view in the sight aperture at three o'clock and repeat the procedure with regard to the inner and outer zones 5050 and 5090 thereof, and he may then repeat the operation with respect to the sectors at four o'clock. He proceeds progressively to repeat the operations with respect to the succeeding pairs of sectors of the inner and outer zones 5050 and 5090 around the display sheet 516 until he has developed the entire composite image desired. He may then erase the composite image which he had progressively developed in this fashion by lifting the edge of the frame 518 which supports the translucent display sheet 516, so as to separate its back surface from adherence with the wax-coating 159 on the underlying web 517 in the localized areas as dictated by the lands that were beneath these portions of the web at the time he applied pressure in the display sheet sectors, which windowed these display sheet portions in the indicated manner.

If it is desired that the display sheet have a greater opacity for higher contrast between its coloration and that of the images developed in this fashion in the successive portions or sectors of the pair of circular zones of the display sheet 516 suitable guidance by the indicator numerals on the disk 503 may be had by providing a circular series of sight apertures or ports in the display sheet radially outward of the outer circular zone with these sight apertures aligned with the aligned sight apertures or ports in the cover sheet 511 and the wax-coated web 517. If it is desired to provide different colorations in the various sectors of the pair of circular zones these differing colors may be embodied in chosen sectors of the wax coating 159 which is carried by the web 517, or in the body of the web itself with the wax coating applied thereover being transparent. For example, the sectors of the outer circular zone 5090 of the web at one o'clock, two o'clock, and three o'clock respectively may be colored green, blue and red, with the succeeding group of three sectors displaying repetitions of these three colors in the same order, and with this coloration arrangement being repeated throughout the outer circular zone. A similar arrangement of differing colors may be provided for the sectors of the inner circular zone 5050 such as blue, purple and orange respectively at one o'clock, two o'clock and three o'clock, and with these colors repeated in the same order in the next succeeding three sectors of the inner zone, and with like repetition throughout the remainder of the inner zone. Such pleasing arrangements of colors in association with the composite images developed in the various sectors may enhance the visual effect of the ultimate composite image developed on the translucent display sheet.

If it is desired to make a permanent record of such a developed composite image the assembly of the parts thereof may be effected upon a flexible opaque sheet of white bond letter paper which may be placed over the wax-coated web 517 in substitution for the translucent display sheet and its carrying frame which are swung away for this purpose, as is proposed above in connection with the development of a permanent record with the use of the FIGS. 10 to 13 incl. embodiment. Placement of such opaque display sheet may be guided by forming the latter in circular shape which will just cover the circular area of the wax-coated face of the web 517, radially inward of the circular zone of the top sheet 511 in which the circumferentially-spaced sight apertures or ports are provided. Thus, either the peripheral margin of the exposed wax-coated face of the web 517 or the circular zone in which the sight apertures or ports 77 are provided may serve as a guide for the proper placement of such disk of opaque paper that is to serve as the display sheet. The tackiness of the wax coating 159 on the web, that serves as the backing surface, also serves as means movably to support this opaque flexible display sheet in its guided placement over the backing means, i.e., the wax-coated web, with the rotary lands-bearing disk underlying them, so as temporarily to hold this display sheet in its relative position with respect to these elements located therebeneath. As has been previously indicated this opaque display sheet may be moved out away from the wax coated web by simply stripping it free from adherence to the wax coating. Such temporary holding adherence may have been effected by light pressure applied to the display sheet in any desired location, such as at the central portions of the circular web and paper display disk which do not enter into the action of development of localized images in circular zones of the display disk radially outward of its central portion, in supplement to that effected at the localized areas where images are developed in the circular zones by the pressure applying and image-developing rubbing means, e.g., a crayon or pencil.

While the embodiments of the present invention which are illustrated, by way of example, in the accompanying drawings are primarily designed to employ as the pressure-applying means manually operated instruments, such as rubbing blocks and marking styli, it is to be understood that other pressure-applying means may be employed to perform this service, such as the pressure applying plate or an equivalent thereof in the form of a plate-like element having a limited face area and the ram or screw of a letter press to force such pressure-applying plate toward the lands reinforced backing means. Obviously such pressure-applying means may be in the form of a hand manipulated small roller, such as a brayer.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims.

I claim:

1. An exhibitor assembly for imprinting observable markings on display planar means by localized pressure, which comprises
   (1) a relatively rigid carrier structure which supports the other elements of the assembly including planar backing means,
   (2) a depressible flexible display planar means supported on said carrier structure and covering at least an appreciable portion of said planar backing means, said display means having an outer face and being of sufficient opacity to block from clear view with appreciable efficacy said planar backing means portion from a point of observation outward of said outer face of said display means, and
   (3) pressure-localizing means including at least one member movably supported by said carrier structure and having a planar surface facing toward said display planar means with said surface bearing a plurality of spaced pressure-localizing raised lands having faces for selective and individual opposition to said display means for localizing pressure therebetween; characterized in that
   (a) said carrier structure is provided with means movably to support said display planar means in a manner permitting movement of the latter out away from said covered planar backing means portion for removal from the assembly of observable markings that are developed on the outer face of said display means in operation of said assembly, said support means guiding placement of said display means over said backing means portion and temporarily holding it in such relative position;
   (b) said faces of said lands which are borne by said pressure-localizing means differ from each other in design with at least some thereof complementing others thereof; and
   (c) said means which movably supports said pressure-localizing member on said carrier structure is of a form to permit successive and guided lateral motion of the faces of said lands borne thereby across the transverse area of the outer face of said supported display planar means successively and selectively to align with successive individual portions of said display outer face each of a chosen plurality of said differing land faces which includes some that are complementary to others thereof in a lateral direction for permitting each of said chosen land faces and one of said display face portions to be selectively aligned and pressed toward each other in a manner that develops on each display face portion an image of the land face that is aligned therewith as such alignments and attendant pressing are successively effected progressively to assemble on said display face a composite image that includes the individual images of the designs of the faces of said chosen lands that are arranged laterally of each other.

2. An exhibitor assembly for imprinting observable markings on display planar means by localized pressure, which comprises
   (1) a relatively rigid carrier structure which supports the other elements of the assembly;
   (2) a Magic Slate sub-assembly embodied in said assembly which includes a planar backing surface of appreciable extent and seemingly distinctive coloration to be firmly supported at least at the time of use in localized areas of applied pressure, and a depressible flexible display planar means having an outer display face and overlying an appreciable area of said backing surface with a relatively minute space intervening the latter and said display means, said display planar means being of distinctively different and contrasting coloration and of sufficient opacity to block from clear view with appreciable efficacy said backing surface from a point of observation that is located an appreciable distance outward of said display face, said flexible display planar means being capable of being windowed in localized portions thereof by application of pressure to its display face in such localized portions which press it thereat firmly against said supported backing surface for permitting observation therethrough at the windowed portions of the seemingly contrasting different color of said backing surface with these windowed portions constituting observable markings;
   (3) means embodied in said Magic Slate subassembly movably to support in guided placement said flexible display planar means in such spaced relation to said backing surface area for temporarily holding said display planar means in such position relative to the latter while permitting said planar member to be moved away from said backing surface for erasing such markings;

(4) pressure-localizing member embodied in said carrier structure having a planar surface which bears a plurality of spaced pressure-localizing raised lands having outer faces which differ from each other in design; and (5) means in said carrier structure movably supporting said pressure-localizing member with the faces of its lands facing toward said display planar means when the latter is in its supported position and in a manner permitting successive and guided lateral motion of its lands-bearing face relative to said display planar means successively and selectively to align the face of each of a chosen plurality of the series of pressure-localizing lands with successive individual portions of said supported display planar means for permitting selective alignment of each of said lands and one of said display means portions and then the latter to be pressed toward the aligned land face with flexure of said display planar means so as to window the latter over the opposed land face and thereby develop on the outer face of this display means portion as an observable marking an image of the face of the land that is aligned therewith and to effect such alignments and image developments successively for progressively assembling on the outer face of said supported display planar means a composite image that includes individual images of the designs of the faces of these lands.

3. The exhibitor assembly of claim 2 in which said planar surface of the pressure-localizing member is subdivided into a plurality of elongated lands-bearing zones that are arranged substantially parallel to each other in the direction of the lateral motion of said member with each of these zones bearing a series of said lands which are successively arranged therein in spaced apart relation and being adapted in the lateral motion of said member to be translated laterally across a different one of a plurality of transverse areas of said supported display planar means.

4. The exhibitor assembly of claim 3 in which the faces of the lands in each of said zones differ in design from each other and from all of those in any of the other of said zones with such differing face designs in each zone being complementary to those in the zones adjacent thereto.

5. The exhibitor assembly of claim 3 in which said presssure-localizing member is in the form of a rotatably supported disk with the plurality of said lands-bearing zones thereof being concentrically arranged on one face thereof about the axis of rotation of said disk.

6. The exhibitor assembly of claim 5 in which said backing surface that underlays said display sheet in spaced apart relation is the outer face of a flexible web facing toward said display planar means with said web in turn overlying the lands-bearing face of said rotatable disk, whereby said flexible web intervenes said supported display planar means and said lands-bearing surface of said disk.

7. The exhibitor assembly of claim 5 in which said backing surface which faces toward said supported display planar means is relatively rigid and said pressure-localizing disk is transparent and rotatably overlays said flexible display planar means with the lands-bearing face of said disk facing toward the latter.

8. The exhibitor assembly of claim 2 in which said pressure-localizing member is in the form of a slide, said carrier structure being provided with at least one channel adapted slidably to receive and guide said slide.

9. The exhibitor assembly of claim 8 in which said carrier structure is provided with a plurality of said channels which are arranged substantially parallel to each other and are adapted selectively to receive and guide said slide for interchange of the position of the latter in said carrier structure.

10. The exhibitor assembly of claim 8 in which said backing surface that underlays said display sheet in spaced apart relation is the outer face of a flexible web facing toward said display sheet with said web in turn covering said channel beneath said sheet.

11. The exhibitor assembly of claim 2 in which said carrier structure and said rotatable disk are provided with cooperative index means to guide selective movement of said disk for aligning a desired one of said lands with a certain portion of said display planar means.

12. The exhibitor assembly of claim 10 in which said slide and said web are provided with cooperative index means to guide selective movement of said slide for aligning a desired one of said lands with a certain portion of said display planar means.

References Cited

UNITED STATES PATENTS

| | | | |
|---|---|---|---|
| 2,543,998 | 3/1951 | Shulman | 35—26 |
| 2,596,890 | 5/1952 | Dechert | 35—66 |
| 3,279,100 | 10/1966 | Knott | 35—61 |

HARLAND S. SKOGQUIST, Primary Examiner

U.S. Cl. X.R.

35—62